United States Patent [19]

De Putter

[11] 3,991,150

[45] Nov. 9, 1976

[54] METHOD FOR FORMING A PLASTIC PIPE

[75] Inventor: Warner Jan De Putter, Hardenberg, Netherlands

[73] Assignee: Industriele Onderneming Wavin N.V., Zwolle, Netherlands

[22] Filed: Nov. 20, 1975

[21] Appl. No.: 636,091

Related U.S. Application Data

[60] Continuation of Ser. No. 517,161, Oct. 23, 1974, abandoned, and a continuation-in-part of Ser. No. 316,084, Dec. 18, 1972, abandoned, which is a division of Ser. No. 68,328, Aug. 31, 1970, Pat. No. 3,728,059.

[30] Foreign Application Priority Data

Sept. 4, 1969 Netherlands.................... 6913490

[52] U.S. Cl................................. 264/68; 264/310; 264/312

[51] Int. Cl.²......................................... B29C 15/00

[58] Field of Search..................... 264/310, 312, 68

[56] References Cited

UNITED STATES PATENTS

| 3,278,665 | 10/1966 | Harrison.................... 264/312 X |
| 3,484,900 | 12/1969 | Sands........................... 425/393 |

FOREIGN PATENTS OR APPLICATIONS

| 980,520 | 1950 | France............................. 264/310 |

*Primary Examiner*—Richard R. Kucia
*Attorney, Agent, or Firm*—James E. Nilles

[57] ABSTRACT

The invention relates to a method for providing a thermoplastic pipe with an inner groove, by subjecting a heat plasticized pipe to the action of some rotatably supported deforming rollers which are expanded and rotated by means of a mandril. A relative rotating motion between said deforming rollers and the pipe is maintained until the pipe is no longer permanently deformable and the relative rotating motion is maintained to strengthen the walls of said groove.

2 Claims, 1 Drawing Figure

U.S. Patent    Nov. 9, 1976    3,991,150
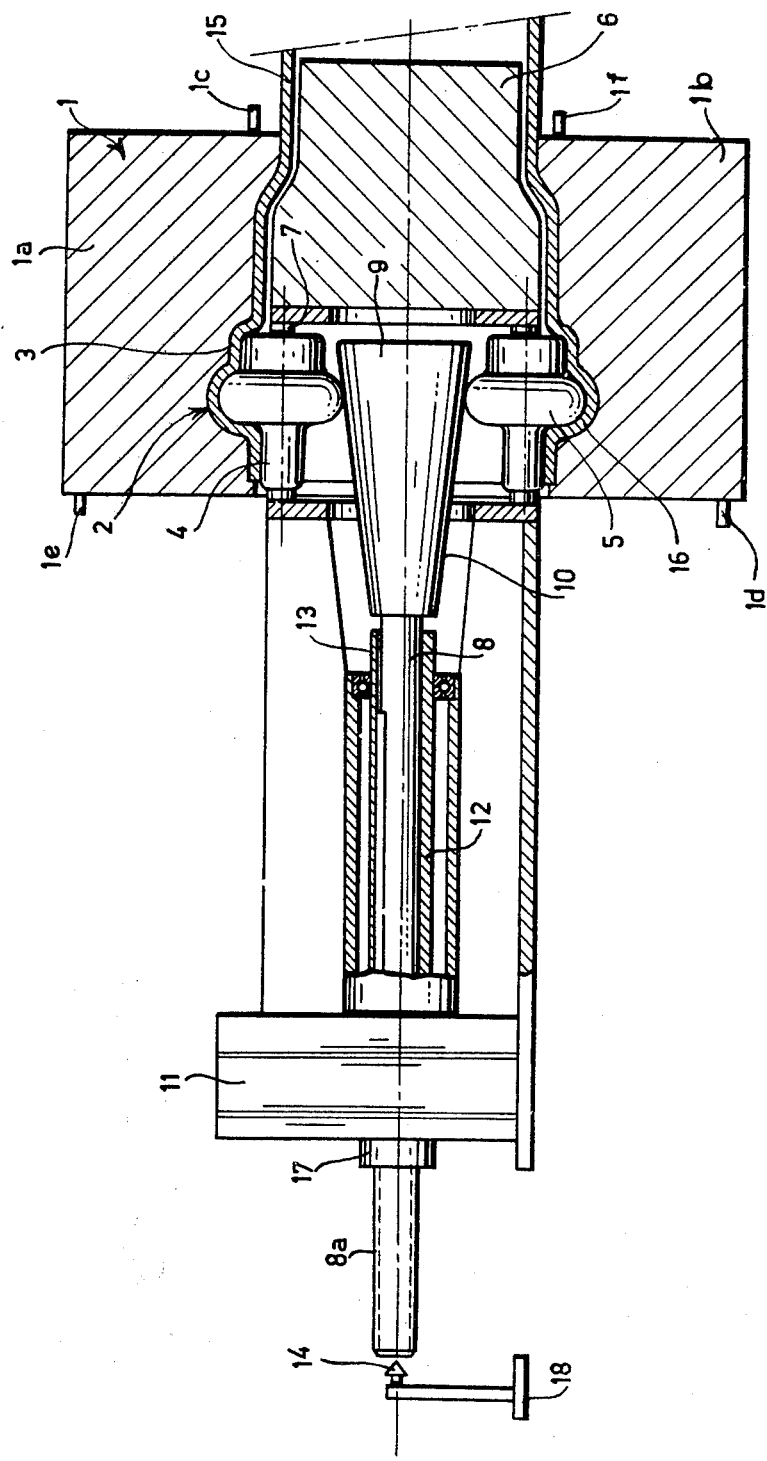

METHOD FOR FORMING A PLASTIC PIPE

This is a continuation of application Ser. No. 517,161, filed Oct. 23, 1974, now abandoned and this is a Continuation-in-Part application from U.S. Ser. No. 316,084, filed Dec. 18, 1972, which was abandoned Dec. 2, 1975, and which is turn is a divisional from U.S. Ser. No. 68,328, filed Aug. 31, 1970, now U.S. Pat. 3,728,059, issued Apr. 17, 1973.

My invention relates to a method for deforming a thermoplastic pipe whilst providing at least one or more grooves, consisting in that around the pipe part to be deformed a divided hollow die is provided having on its inner side an annular cavity which corresponds to the inner shape of the finished groove in the tube to be deformed, and in that radially expansible deforming means are disposed within the pipe to be deformed, the pipe part to be deformed is plasticized to form the groove and the deforming means are moved outwardly thereby expanding the plastic pipe so that the latter is adapted to the inner wall of the die, whereupon the pipe is cooled until same is no longer permanently deformable and the hollow die is removed.

According to the prior art method, however, an inflatable ring is applied as a deforming means which by the aid of a conical core is expanded in such a way that the plastic pipe is adapted to the cavity in the hollow die, thereby forming the desired groove in the plastic pipe. The elastomer used for this deforming ring is however not suitable for the manufacture of a plastic pipe with an inner groove which satisfies very close tolerances.

To a decreasing extent, however, the ends of these pipes and the grooves provided therein should satisfy very close tolerances, especially, when pipes with a large diameter are used.

It is now an object of the invention to provide a method whereby the end of a pipe can be deformed and provided with an inner groove whilst observing very close tolerances.

This object is attained according to the invention in that there is provided a method for deforming a plastic pipe to provide at least one groove therein comprising the steps of providing around said pipe a divided hollow die having at least one annular cavity on its inner side, disposing radially expansible and relatively rotatable deforming means within said pipe, radially expanding and effecting relative rotating motion between said deforming means and said pipe while said pipe in a heated state to facilitate the formation of the groove so that said pipe conforms to the shape of the cavity in said die, stopping expanding movement of said deforming means while maintaining relative rotating motion between said deforming means and said pipe, and cooling said pipe to a temperature at which it is no longer permanently deformable while said relative rotating motion is maintained to strengthen the walls of said groove.

The invention will be clarified with reference to the drawing in which a section through an apparatus for executing the invention is represented.

The device according to the invention comprises a hollow mould 1 consisting of two mould halves 1a and 1b. The mould halves 1a and 1b are provided on the inner side with an annular cavity 2, while moreover besides this annular cavity 2 further recesses 3 and 4 are provided in the inner wall of the die. The mould halves are provided with an inlet 1c, 1d and an outlet 1e and 1f for introducing a cooling or heating medium.

The device comprises further radially expansible deforming means 5 in the shape of moulding rollers. These moulding rollers 5 are resiliently secured in a widening pin 6, the rollers being due to the action of a closed spring 7 being drawn, however, in the direction of the axis of the device.

These moulding rollers 5 have a profile 8 which corresponds to the shape of the profile of the inner wall of the die 1 at the location of the recesses 3 and 4 and the annular groove 2.

The moving means 9 for radially moving outwards the deforming means 5 consist of a conical mandril 9 which through the shaft 8 can be moved in a longitudinal direction by driving means 17. These driving means 17 comprise e.g. a gear wheel which cooperates with screw thread 8a provided on the shaft 8 which shaft with a sliding key way 13 is secured in a sleeve 12.

Through rotative means 11 in the shape of a gear box driven by an engine the shaft 8 and the mandril 9 connected therewith will be rotated. Due to this rotation the moulding rollers 5 engaging the wall 10 of the conical mandril 9 and the widening pin 6 will be rotated, too.

It will be obvious that pin 6 may consist of two parts, viz. a fixed part and a free rotatable part supported by mandril 9.

For the delimitation of the movement of the shaft 8 and consequently of the mandril 9 in the longitudinal direction the device is provided with a delimiting member in the shape of a micro switch 14 which ensures that the driving means 17 for the shaft is switched off, however, not the rotative means 11 for the rotary motion.

In order to stop the rotative means 11 the device is provided with time regulating means in the shape of a time clock 18 which acts upon the rotative means 11 by ending the electric feeding of the rotative means.

The speed of the movement in the longitudinal direction can be obtained by changing the gear wheels and the screw thread on the shaft. For the provision of a groove at the end of a plastic pipe 15 one proceeds as follows:

After the rollers 5 are at the smallest possible distance of the shaft a plasticized polyvinylchloride pipe of 190° C is slid over the rollers. Before sliding the pipe over the rollers 5 and widening 6, the pipe is widened such that pin 6 can freely rotate in the pipe. Thereupon two mould halves 1a, 1b are provided around that end. It is obvious that also the plastic pipe can be plasticized, by heating in the mould halves.

Thereupon the driving means 17 and rotative means 11 are set into motion e.g. by a motor (not shown), whereby the shaft 8 with the mandril 9 starts to rotate and the mandril 9 is also moved in the longitudinal direction by moving the moulding rollers 5 radially outwards. Due to the movement of the mandril 9 the widening pin part 6 will be rotated, too.

During this movement the moulding rollers 5 rotate and a groove 16 is produced in the widened out end because the plastic pipe contacts the walls of the recesses 2, 3 and 4 of the mould.

As soon as the end of the shaft 8 reaches the micro switch 14 the longitudinal movement of the shaft 8 is ended and only the mandril is rotated due to the effect of the rotative means 11, whereby simultaneously the cooling of the mould is started by introducing cold water of 18° C via 1c and 1d. The time clock 18 is adjusted in such a way that the rotative means 11 are effective until the plastic pipe has reached a temperature at which the pipe is no longer permanently deformable and exclusively the normal shrinkage caused by the linear coefficient of expansion can be produced e.g. a temperature below 90° C and preferably below 70° C for PVC tubes. The relative rotating motion of the rollers 9 during the cooling of the plastic pipe is maintained to strengthen the wall of the pipe. The adjustment of the time clock will depend on many factors such as wall thickness, composition of the plastic and so on.

Hereupon the mould halves 1a, 1b of the die are removed from each other and the pipe can be removed after the rollers 5 due to the displacement of the mandril 9 have assumed a position which is as close as possible to the shaft.

It is obvious that besides the provision of the grooves also a deformation already effected can be exactly calibrated during the action of the moulding rollers 5.

The moulding rollers 5 can be profiled in such a way that the entire widened out part of the pipe is produced at the same time with the formation of the groove.

Finally the starting point may be a pipe part with a thickened end, or, after the formention of the groove, the end of the pipe can be thickened or previously the end of the pipe be provided with a sleeve.

It should be noted that it is not necessary to plasticize the plastic pipe before rotation of the rollers, as the heat produced by the friction of the rotating rollers will also contribute to a temperature increase of the pipe facilitating the formation of the groove.

This is e.g. particularly preferred in a method of deforming a polyethylene pipe. In that case an unheated polyethylene pipe 15 of room temperature is placed in the mould 1. During the contact of the rotating rollers 5 with the inner wall of polyethylene pipe 15 heat is produced by friction of the rotating rollers 5 and after a short time the polyethylene has obtained a temperature allowing the deformation of the polyethylene. This temperature may vary from 100° to 130° C.

The same step can be applied to other polyolefins such as polypropylene.

What I claim is:

1. A method for deforming a plastic pipe to provide at least one groove therein comprising the steps of providing around said pipe a divided hollow die having at least one annular cavity on its inner side, disposing radially expansible and relatively rotatable deforming means within said pipe, radially expanding and effecting continuous contact and relative rotating motion between said deforming means and a portion of said pipe in which said groove is to be formed while said portion of said pipe is in a heated state to facilitate the formation of the groove so that said portion of said pipe conforms to the shape of the cavity in said die, stopping expanding movement of said deforming means while maintaining relative rotating motion and continuous contact between said deforming means and said portion of said pipe, and cooling said portion of said pipe to a temperature at which it is no longer permanently deformable while said continuous contact and relative rotating motion is maintained with said portion of said pipe to strengthen the walls of said groove, and wherein said portion of said pipe is brought in a heated state to facilitate the formation of the groove by contacting said deforming means while maintaining relative rotating motion and continuous contact between said deforming means and said portion of said pipe.

2. A method for deforming a plastic pipe from the inner side to provide at least one groove therein comprising the steps of providing around said pipe a divided hollow die having at least one annular cavity on its inner side, disposing radially expansible and rotatable deforming means within said pipe, radially expanding and rotating said deforming means in continuous contact with a portion of said pipe while said portion of said pipe is in a heated state facilitating the formation of the groove so that said portion of said pipe conforms to the shape of the cavity in said die, stopping expanding movement of said deforming means while maintaining said deforming means in rotary motion and in continuous contact with said portion of said pipe, and cooling said portion of said pipe to a temperature at which it is no longer permanently deformable and at which only normal shrinkage caused by the linear coefficient of expansion can be produced before said rotary motion of said deforming means and continuous contact with said portion of said pipe is stopped, and wherein said portion of said pipe is brought in a heated state to facilitate the formation of the groove by contacting said deforming means while maintaining relative rotating motion and continuous contact between said deforming means and said portion of said pipe.

* * * * *